United States Patent [19]
Valince

[11] 3,731,904
[45] May 8, 1973

[54] BALL VALVE
[75] Inventor: Louis J. Valince, Euclid, Ohio
[73] Assignee: Parker-Hannifin Corporation, Cleveland, Ohio
[22] Filed: Feb. 3, 1972
[21] Appl. No.: 223,216

[52] U.S. Cl. ................................................251/315
[51] Int. Cl. ..............................................F16k 5/06
[58] Field of Search......................251/315, 317, 308, 251/309, 310, 172, 175, 360

[56] References Cited

UNITED STATES PATENTS

| | | | |
|---|---|---|---|
| 2,825,527 | 3/1958 | Wendell | 251/315 X |
| 2,868,497 | 1/1959 | Graham | 251/172 |
| 2,925,994 | 2/1960 | Downs et al. | 251/360 |
| 3,078,865 | 2/1963 | Estes et al. | 251/172 X |
| 3,378,026 | 4/1968 | Oliver | 251/172 X |
| 3,497,177 | 2/1970 | Hulsey | 251/172 |
| 3,521,855 | 7/1970 | Jensen | 251/315 X |
| 3,667,727 | 6/1972 | Bowden | 251/315 X |
| 3,678,956 | 7/1972 | Ebin | 251/172 X |

Primary Examiner—Samuel Scott
Attorney—John N. Wolfram

[57] ABSTRACT

An on-off valve having a body with a passage therethrough, a valve element within the passage to control fluid flow therethrough, a sealing assembly on each side of the valve element and each assembly comprising a retainer ring between the body and the valve element, a seat ring in each retainer ring to seal against leakage between the valve element and retainer rings, a sealing ring disposed between the retainer ring and body, the sealing ring serving to permit fluid bypass of the retainer ring on the upstream side and enter the passage where the valve element is located but to seal and prohibit fluid bypass on the downstream side, the sealing ring on the downstream side engaging parallel faces in the retainer and body to seal against fluid bypass, the sealing ring on the upstream side being expanded in outside diameter by fluid pressure to reduce its cross section to thereby disengage from one of the parallel surfaces and permit fluid bypass, and the sealing assemblies being identical whereby either side of the flow passage may be the inlet or outlet.

9 Claims, 5 Drawing Figures

PATENTED MAY 8 1973 3,731,904

BALL VALVE

BACKGROUND OF THE INVENTION

Permitting fluid pressure to bypass the upstream seat in ball valves is very desirable particularly under high pressure and temperature conditions. Ball valves may be difficult to turn under high pressure conditions due to the loading on the ball thus making it desirable to use low torque materials such as teflon as seat rings. However, these materials have a tendency to cold flow under high temperature and pressure conditions. By permitting fluid pressure to bypass the upstream retainer ring, fluid pressure is balanced on each side of the seat ring thereby eliminating the chance of cold flow.

SUMMARY OF THE INVENTION

The present invention provides a simple and effective method of achieving bypass of fluid on the upstream side with sealing on the downstream side. It accomplishes this by providing opposed paralleled transverse faces on the retainer rings and body and by positioning an O-ring therebetween that contracts in OD to increase its cross section diameter so as to engage and seal the faces on the downstream side and which expands in OD to decrease its cross section diameter so as to disengage from one of the faces and permit fluid bypass on the upstream side.

Furthermore, provision is made to assure that the expanded O-ring at its OD will not inadvertently seal the bypass path by providing a spirally grooved surface opposite the O-ring OD that cannot be sealed by contact of the O-ring thereagainst.

DETAILED DESCRIPTION

Figure 1:
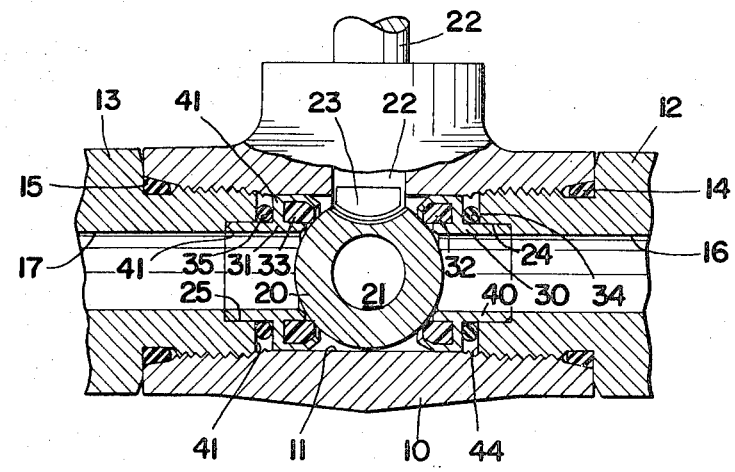
FIG. 1 is a partial longitudinal section through the body of a ball valve employing the present invention.

FIG. 1 illustrates a ball valve, utilizing the present invention, having a body 10 and bore 11 therethrough. End connectors 12 and 13 threadably engage the body 10 at the outer ends of the body bore. Disposed between the end connectors and body, are sealing rings 14 and 15. The end connectors 12 and 13 have bores 16 and 17, respectively, in fluid communication with the body bore 11.

Disposed within the body bore to control fluid flow therethrough is ball valve element 20 having a bore 21 therethrough. A shaft 22 is disposed through the body and having one end 23 engaging the ball. The other end of the shaft is connected to a handle (not shown) for rotatably moving the valve element.

The end connectors 12 and 13 have counterbores 24 and 25 respectively. Disposed between the valve element and the respective end connector are sealing assemblies comprised of retainer rings 30 and 31, seat rings 32 and 33, and sealing rings 34 and 35. Each retainer has a sleeve position 40 and 41 which respectively engages the counterbore of the adjacent end connector. Sealing rings 34 and 35 may be of any shape but the preferred embodiment being an O-ring, disposed around the respective sleeve. The normal inside diameter of the sealing ring equal to or less than the outside diameter of the sleeve. Under static conditions the sealing rings being compressed between radial walls 47 or 43 of the respective retainer ring and radial walls 44 or 45 of the respective end connector.

The retainer rings 30 and 31 having seat rings 32 and 33 respectively disposed therein and preferably being made of a low torque material, e.g. teflon. Under the preferred embodiment of the invention the seat would be captive in the retainer as shown in the figures.

OPERATION

Figure 2:
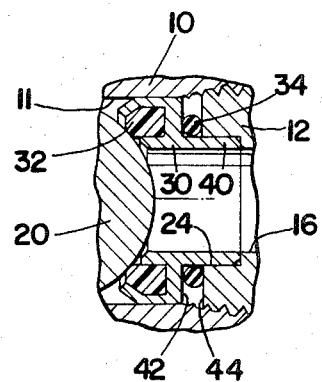
FIG. 2 is an enlargement of an area of the ball valve of FIG. 1 at the upstream retainer ring.

FIG. 2 is an enlarged view of a retainer ring of FIG. 1 under zero fluid pressure. The sealing ring 34 is in contact with the sleeve portion 40, a radial wall 42 of the retainer, and a radial wall 44 of the end connector.

Figure 3:
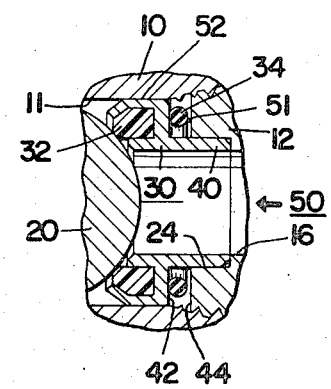
FIG. 3 is a view of the upstream retainer ring of FIG. 2 under moderate fluid pressure.

FIG. 3 is another view of the retainer assembly of FIG. 1 and 2 under influence of moderate fluid pressure. Fluid flow is from right to left as shown by indicator 50 and the retainer 30 is on the upstream side of the valve element. To balance pressures on both sides of seat 32, the sealing ring is sized so that under fluid pressure the overall diameter of the ring expands thus decreasing the cross sectional diameter and allowing fluid to bypass at point 51. Fluid is then permitted to flow into the body bore by way of a clearance at 52.

Figure 4:
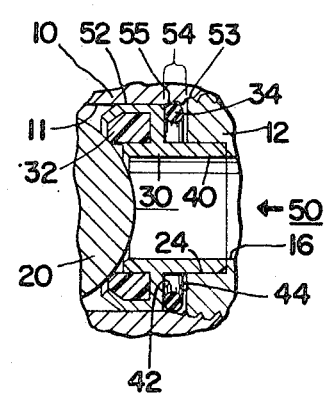
FIG. 4 is a view of the upstream retainer ring of FIG. 2 under high fluid pressure.

FIG. 4 shows the upstream retainer assembly of FIG. 3 under either constant high fluid pressure or a sudden surge. Under these conditions the sealing ring 34 expands its overall diameter until it is limited by the body bore. The valve is assembled such that the tread runout 53 from attaching the end connector occurs across the area where the sealing ring may contact the body bore inner surface. The tread runout prohibits the sealing ring from forming a seal against the body bore and permits fluid to bypass at 55 and from there through clearance 52.

Figure 5:
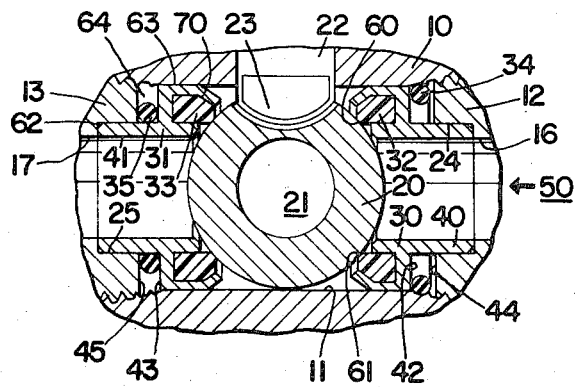
FIG. 5 is an enlargement of the ball valve of FIG. 1 showing the upstream and downstream retainer rings under high fluid pressure.

FIG. 5 shows both the upstream and downstream retainer ring assemblies under high fluid pressure. Fluid pressure bypasses the upstream seal as previously described thus there is a resultant fluid pressure between points 60 and 61 forcing the valve element 20 downstream against the downstream retainer 31 until it is mechanically stopped at 62. Thus the downstream sealing ring 35 is further compressed between the retainer and end connector. Fluid pressure bypasses the outside of the downstream retainer at 63 and enters area 64 on the radially outer side of the sealing ring. There the fluid pressure forces the sealing ring inward against the sleeve portion, retainer radial wall, and end connector radial wall thus providing a fluidtight seal whose sealing pressure increases as the system fluid pressure increases.

Fluid pressure that seeps into the seat along surface 70 tends to push the seat into the retainer thus actively opposing blowout of the seat. Wear or minor fluid deformation of the downstream seat will be compensated by the resultant fluid pressure acting on the upstream side of the valve element, tending to force the valve element into sealing engagement with the downstream seat. The invention operates with equal efficiency in either direction making the valve reversable.

I claim:

1. In a valve, a body having a valve chamber therein and a bore therethrough that intersects the chamber, the body also having a transverse face on each side of the chamber and surrounding the bore, a valve element in said chamber, a sealing assembly mounted in the bore on each side of the valve element, each sealing assembly comprising a retainer ring and a sealing ring, each retainer ring having a cylindrical surface and a transverse face spaced from and parallel to a respective one of said body transverse faces, each sealing encircling the cylindrical surface and located between the respective parallel faces and normally being in sealing contact therewith to prevent fluid flow between the retainer and body, each sealing ring being expandable in diameter by fluid pressure acting on its inner diameter whereby its cross section dimension decreases so that the sealing ring disengages from one of said faces to permit fluid flow between the retainer and body.

2. The valve of claim 1 wherein the sealing assembly includes means to prevent the sealing ring, when expanded to its maximum diameter, from inadvertant sealing against the body and retainer to preclude bypass flow.

3. The valve of claim 1 wherein the retainer ring is one piece.

4. The valve of claim 1 wherein said retainer ring includes a captive seat abutting said valve element.

5. The valve of claim 4 wherein the body is comprised of a main portion and end connectors threadably engaging the main portion whereby the means to prevent inadvertant preclusion of bypass flow comprises the thread runout of the main portion.

6. In a valve, a body having a valve chamber therein and a bore therethrough that intersects the chamber, the body also having a transverse face on each side of the chamber and surrounding the bore, a valve element in said chamber, and a sealing element in said chamber, and a sealing assembly mounted in the bore on each side of the valve element, each sealing assembly comprising a retainer ring and a sealing ring, the retainer ring having a cylindrical surface and a transverse face spaced from a respective one of said body transverse faces, the sealing ring encircling the cylindrical surface located between the transverse faces, the improvement which comprises means to prevent inadvertant sealing by the sealing ring between the transverse face of the retainer ring and a surface of the body other than the transverse surface.

7. The valve of claim 6 wherein the means to prevent inadvertant sealing is a spiraled groove on a body surface defining the valve chamber.

8. The valve of claim 6 wherein the body is comprised of a main portion and end connectors threadably engaging the main portion whereby the thread runout on the main portion is the means to prevent inadvertant sealing.

9. In a valve, a body having a valve chamber therein, a bore therethrough that intersects the chamber, and a transverse face on each side of the chamber and surrounding the bore;
   a valve element in the chamber;
   a sealing assembly mounted in the bore on each side of the valve element;
   each sealing assembly comprising a retainer ring and a sealing ring;
   each retainer ring having a cylindrical surface and a transverse face spaced from and parallel to a respective one of said body transverse faces;
   each sealing ring encircling a respective cylindrical surface and being located between the parallel faces and normally being in sealing contact therewith to prevent fluid flow between the respective retainer and body;
   each sealing ring being expandable in diameter by fluid pressure acting on its inner diameter whereby its cross section dimension decreases so that the sealing ring disengages from one of said faces to permit fluid flow between the respective retainer and body;
   each retainer ring being one piece and having a captive seat abutting the valve element;
   the body having a main portion and end connectors threadably engaging the main portion;
   the valve chamber having thread runout grooves from the threaded engagement of the end connectors;
   the grooves preventing the sealing ring from inadvertantly sealing between the retainer and body whereby at maximum expansion of the sealing ring, fluid flow between the retainer and body is maintained.

* * * * *